United States Patent
Conzatti et al.

(10) Patent No.: US 8,292,487 B2
(45) Date of Patent: Oct. 23, 2012

(54) LIGHT GUIDE ELEMENT FOR A LIGHTING DEVICE

(75) Inventors: Günther Conzatti, Völs (AT); Harald Weingärtner, Sautens (AT); Paul Swarovski, Aldrans (AT)

(73) Assignee: AL Systems GmbH, Wattens (AT)

( * ) Notice: Subject to any disclaimer, the term of this patent is extended or adjusted under 35 U.S.C. 154(b) by 0 days.

(21) Appl. No.: 13/099,607

(22) Filed: May 3, 2011

(65) Prior Publication Data

US 2011/0205745 A1  Aug. 25, 2011

Related U.S. Application Data

(63) Continuation of application No. PCT/AT2009/000422, filed on Nov. 2, 2009.

(30) Foreign Application Priority Data

Nov. 4, 2008 (AT) ................ A 1718/2008

(51) Int. Cl.
F21V 8/00 (2006.01)

(52) U.S. Cl. ............. 362/616; 362/511; 362/625

(58) Field of Classification Search ........... 362/616, 362/511, 551

See application file for complete search history.

(56) References Cited

U.S. PATENT DOCUMENTS

| | | | |
|---|---|---|---|
| 2,480,178 A | | 8/1949 | Zinberg |
| 6,268,600 B1* | | 7/2001 | Nakamura et al. ............ 250/216 |
| 6,272,265 B1* | | 8/2001 | Franklin ........................ 385/31 |
| 6,367,957 B1 | | 4/2002 | Hering et al. |
| 6,487,350 B1* | | 11/2002 | Veligdan et al. ............. 385/120 |
| 7,195,383 B2* | | 3/2007 | Gebauer ....................... 362/511 |
| 7,298,947 B2* | | 11/2007 | DeSanto et al. ............. 385/116 |
| 7,324,278 B2* | | 1/2008 | Kuo et al. .................... 359/460 |
| 7,712,918 B2* | | 5/2010 | Siemiet et al. ............... 362/241 |
| 2005/0254539 A1 | | 11/2005 | Klimek |
| 2006/0044825 A1* | | 3/2006 | Sa ................................ 362/600 |
| 2007/0140616 A1 | | 6/2007 | Sugita et al. |
| 2007/0247862 A1 | | 10/2007 | Tanghe et al. |
| 2008/0205081 A1* | | 8/2008 | Ijzerman et al. ............. 362/616 |

FOREIGN PATENT DOCUMENTS

| | | |
|---|---|---|
| AT | 9091 | 4/2007 |
| DE | 198 03 987 | 8/1998 |
| DE | 20 2007 003497 | 5/2007 |
| EP | 0 584 545 | 3/1994 |
| EP | 1 033 526 | 9/2000 |
| EP | 1 335 218 | 8/2003 |
| EP | 1 701 199 | 9/2006 |

(Continued)

OTHER PUBLICATIONS

International Search Report issued Apr. 27, 2010 in International (PCT) Application No. PCT/AT2009/000422.

(Continued)

*Primary Examiner* — Peggy A. Neils
(74) *Attorney, Agent, or Firm* — Wenderoth, Lind & Ponack, L.L.P.

(57) ABSTRACT

A light guide element for a lighting device is elongated in the direction of a main axis and includes a light coupling surface extending transversely to the longitudinal direction and a light emission surface radiating transversely to the longitudinal direction, and two or more light guides stacked on top of one another, wherein a partial region of the wall of the individual light guides extending in the longitudinal direction is structured and/or blackened.

41 Claims, 11 Drawing Sheets

FOREIGN PATENT DOCUMENTS

| | | |
|---|---|---|
| FR | 2 799 263 | 4/2001 |
| FR | 2 804 494 | 8/2001 |
| KR | 100 314 678 | 11/2001 |
| WO | 2004/052682 | 6/2004 |
| WO | 2004/114418 | 12/2004 |
| WO | 2006/126155 | 11/2006 |
| WO | 2007/034397 | 3/2007 |
| WO | 2007/072340 | 6/2007 |

OTHER PUBLICATIONS

Austrian Patent Office Search Report issued Sep. 14, 2009 in corresponding Austrian Patent Application No. A 1718/2008.

* cited by examiner

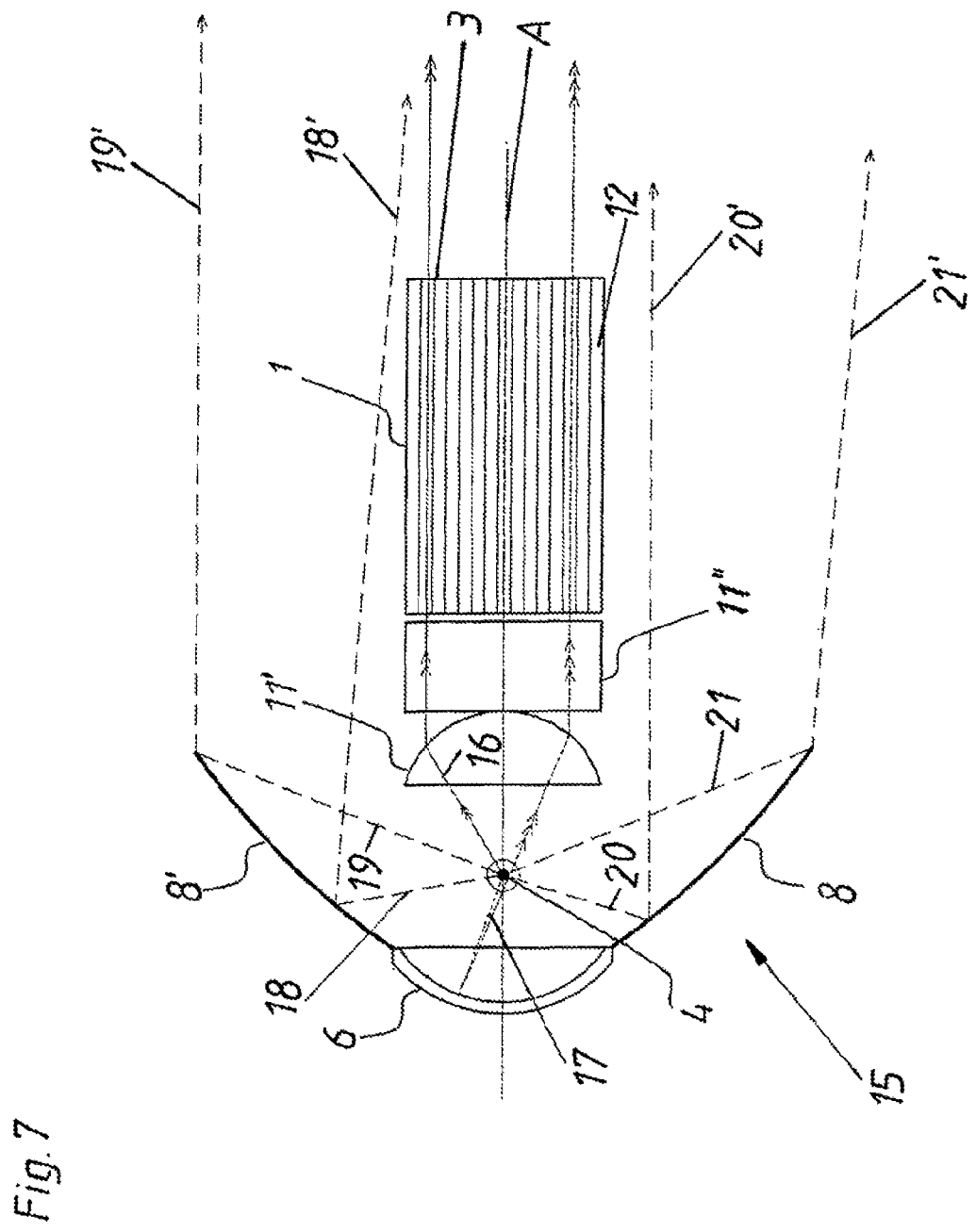

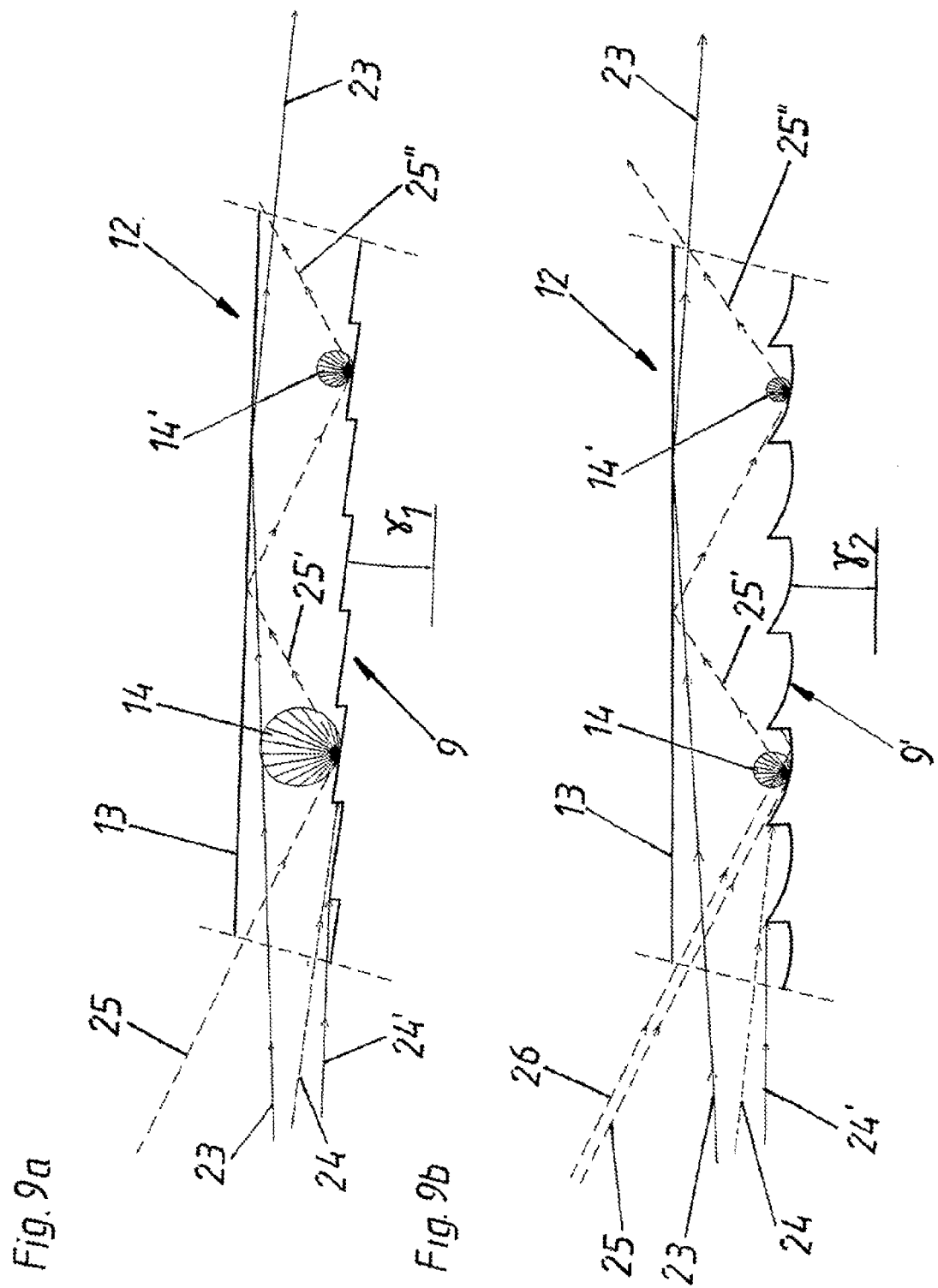

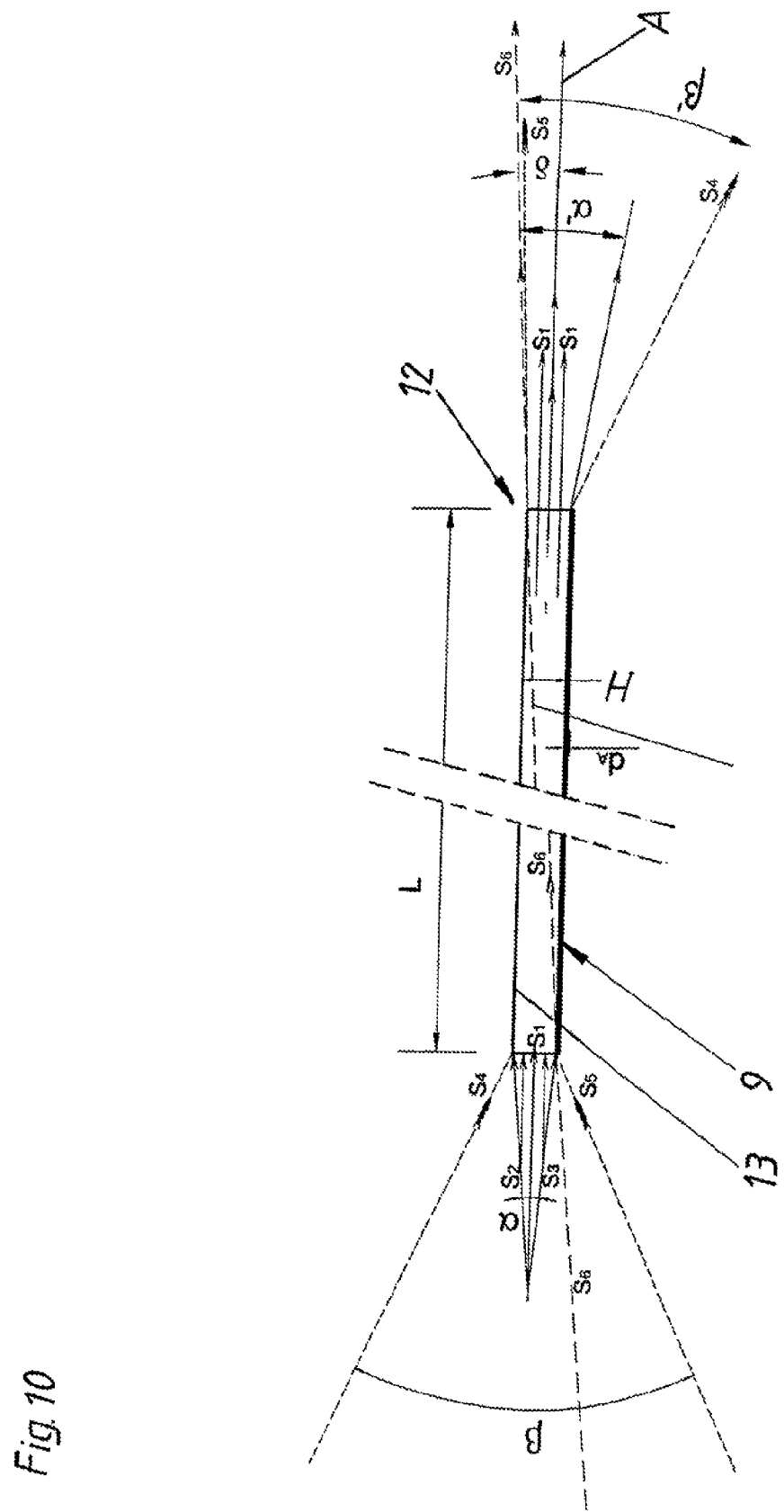

US 8,292,487 B2

LIGHT GUIDE ELEMENT FOR A LIGHTING DEVICE

This application is a Continuation of International application Serial No. PCT/AT2009/000422, filed Nov. 2, 2009, the entire disclosure of which is incorporated herein by reference.

BACKGROUND OF THE INVENTION

I. Technical Field

The present invention concerns a light guide element for a lighting device, wherein the light guide element is elongated in the direction of a main axis and has a light entrance surface extending transversely relative to the longitudinal direction and a light exit surface emitting light transversely with respect to the longitudinal direction, and has two or more mutually superposed light guides.

II. Description of the Related Art

An example of a such light guide element is shown in DE 20 2007 003 497 U1.

A disadvantage with that light guide element and other light guide elements known from the state of the art is that the light issues non-homogeneously from the light guide element, wherein it is not possible to implement a precise limit between a light region which is lit up and a dark region which is not lit up, this applying in particular to luminous density distribution, in spite of all endeavours, so that a vehicle headlight provided with such a light guide element inevitably blinds oncoming vehicle drivers.

In that respect blinding people who are looking in the direction of lighting devices is a great problem in various everyday regions of life. Besides the blinding effect which occurs in road traffic, that problem equally concerns street lighting arrangements, for example for lighting up tunnels, lighting public areas such as for example sports grounds, lighting workplaces or residences and so forth. Thus, for example, the risk of a fatal traffic accident is more than twice as high at night as in the day, although on average only a quarter of all accidents occur at night. In that respect a main reason for such blinding effects which are unpleasant in everyday life and dangerous in road traffic represents a light/dark limit of the lighting region of the lighting devices, that limit being defined exclusively by way of the intensity of lighting. It will be noted that what is more relevant for the blinding effect is the physiological lightness effect, afforded by the luminous density, which is specified in the units of candelas per square meter.

To make that light/dark limit sharper and more precise, the state of the art already discloses many different possible ways of bundling the light issuing from the light exit surface of headlights. Besides the methods which have already long been known of bundling by reflectors or mirrors, in recent times the light from one or more light sources is additionally bundled by means of a light guide element of a special configuration, wherein the light of the light sources is coupled into the light guide element in a light coupling-in region and is then passed for example by means of refraction and/or total reflection to a light exit surface where it thereupon illuminates a certain light region. For vehicle headlights that affords a light lobe which is generally shaped asymmetrically for low ray headlights.

SUMMARY OF THE INVENTION

The object of the present invention is to provide a light guide element which allows a lighting device having such a light guide element to have a precise pronounced light/dark limit and permits the blinding effect of such a lighting device to be markedly reduced.

That object is attained by a light guide element according to the present invention.

Firstly, the primary direction of light emission is defined by the elongate configuration of the light guide element. In that case, each of the mutually superposed light guide elements can have a main axis which are then in substantially mutually parallel relationship. The mutually superposed light guides can in that case be fixed to each other for example by adhesive. The main axis of the light guide element is then a straight line parallel thereto, for example through the geometrical center point of the light exit surface. For the situation where one or more of the light guides has edges in the longitudinal direction, the main axis is substantially parallel to one or more of those edges. The superimpositioning of a plurality of such light guides increases the light flux in the direction of the main axis and in that way improves lighting by a lighting device having such a light guide element. The light rays entering at the light entrance surface, which is arranged transversely relatively to the longitudinal direction, either spread out in a straight line in the light guide element (in particular if the radiation passing into the light guide element is already bundled), or they are passed by means of total reflection to the light exit surface, which is also arranged transversely relative to the longitudinal direction.

If now a partial region of the wall of the light guide, wherein that region extends in the longitudinal direction, is provided with a structure, the geometrical condition for total reflection is no longer satisfied for a light ray incident on that structure, and it is prevented from being passed to the light exit surface. Depending on the respective configuration of that structure, a bundle of light rays which are incident on the wall in that region is partially refracted and deflected out of the light guide, and additionally or alternatively diffusely reflected, which thus also no longer issue from the light exit surface from the light guide element. Additionally or alternatively it is possible to blacken a partial region of the wall, that extends in the longitudinal direction, that is to say to provide it with a material having a high absorption coefficient which is preferably above 95%. Light rays incident in that region are then also no longer totally reflected in the direction of the light exit surface, but are absorbed.

By virtue of the arrangement of the structure or blackening therefore, certain light rays which are propagated inclinedly in the light guide are blanked out, diffusely reflected and absorbed. Such light rays, which are propagated inclinedly with respect to the longitudinal direction, would also issue inclinedly from the light exit surface, and thus have a negative influence on light bundling. Accordingly certain inclinedly extending rays can be eliminated by those measures, and parallelisation or bundling of the light issuing from the light guide element can be significantly improved. The regions of the wall, that are not provided with a structure, or the unblackened regions of the wall, are still available for total reflection or can also be of a mirrored nature. Although this is preferably provided, not all light guides of the light guide element have to have partial regions in their walls, that are provided with a structure or an absorbance.

The above-mentioned structure or blackening makes it possible to provide that at least 95%, and preferably more than 99%, of the radiation incident on the partial regions of the wall of the light guides, that are provided with a structure or blackened, are absorbed there. As the radiation incident in those partial regions of the wall is inclined with respect to the longitudinal direction of the light guides, the radiation issuing from the light exit surface is distinguished by a high degree of parallelism or bundling. In particular, a preferred direction of the issuing radiation can be blanked out by the arrangement of the structure or the blackening at only one side of the wall effectively, down into the region of tenths of a degree.

To implement a special light/dark limit, for example approximately in a horizontal direction when using such a light guide element in a vehicle headlight, it can be provided that quite specific partial regions of the wall are provided with a structure and/or blackened. In that case that light/dark limit can relate to the luminous density distribution produced by a lighting device including a light guide element according to the invention. In the case of the vehicle headlight those partial regions can be at the underside of the wall of the respective light guide so that the light rays incident at the underside in those regions are absorbed or diffusively reflected or blanked out. Total reflection in contrast is possible at the top side of the light guides, opposite to the underside. More specifically rays reflected there are propagated downwardly and do not interfere with the substantially horizontal light/dark limit to be implemented for a vehicle headlight, in which respect only the region arranged beneath the horizontal is to be lit up because only the inclinedly upwardly extending light rays are affected by the structure or the blackening.

A further possible use of such a light guide element is afforded by a lighting device for an inside room or a wall lighter where a selective angular region is blanked out and in return a sharply defined region, for example a picture hanging on a wall, is to be lit up.

The above-mentioned absorption or diffuse reflection and blanking-out is further enhanced by an arrangement of the structured region over the entire length of the individual light guides and additionally or alternatively the blackened regions over substantially the entire length of the light guides. In that respect it can be provided that some regions are blackened while others are structured and once again other regions of the light guides can be both structured and also blackened. Partial regions of the wall can be mirrored for selectively producing a light/dark limit of a lighting device with a light guide element according to the invention. Preferably that involves regions which are opposite the structured or blackened regions. In that way, light rays of a specific direction are selectively absorbed or blanked out or diffusively reflected just as by the arrangement of regions at which total reflection is possible.

In a preferred embodiment of the invention at least two of the light guides are arranged directly in contact and therefore directly in mutually adjoining relationship one above the other. It can also be provided that said contact is afforded only indirectly by means of a suitable intermediate portion. It can further be provided that each of the light guides is in direct or indirect contact with a further light guide. On the other hand however it can also be envisaged that the light guides are arranged spaced from each other. In that respect however it is advantageous if the longitudinal directions of the light guides are arranged in substantially mutually parallel relationship.

In a particularly advantageous embodiment of the invention the individual light guides are of a prismatic, preferably parallelepipedic, configuration. In that case it is provided that the greatest extent of the parallelepiped is arranged in the longitudinal direction of the light guide element and the prismatic, preferably rectangular cross-section, is arranged perpendicularly to the longitudinal direction, wherein in the case of a rectangle the mutually superposed light guides respectively adjoin each other at the longer side of the rectangle. It will be noted however, in general, that any cross-sectional shapes are possible, in which respect, it is advantageous for one extent of the cross-section to be much less than another.

An advantageous embodiment of the invention provides that the prismatic light guides are provided with structured and/or blackened regions at a long side of the prism. It can be particularly advantageous in that respect if this respectively involves the underside of the wall of the mutually adjoining individual light guides so that light rays are primarily only now reflected in a straight line or at the top side downwardly, whereby the preferential direction of the light issuing from the light exit surface is in a straight line or is oriented downwardly.

It will be appreciated that there are also many different possible options for the nature of the structure arranged in a partial region of the wall, that extends in the longitudinal direction. For example, in an embodiment of the invention, it is provided that the structure is such that it has a sawtooth profile in cross-section. In that case, depending on the respectively incident ray the geometrical conditions for total reflection are no longer met at the regions of the tooth flanks of the sawtooth structure, that are inclined in comparison with the remainder of the wall, so that parts of the ray are refracted and deflected perpendicularly through the wall and are thus blanked out. Rays are blocked at the flanks which are substantially perpendicular relative to the wall, and are thus also blanked out of the ray bundle. In that case, the tooth flanks of the sawtooth profile involve an inclination of between 3 and 45°, preferably between 3 and 10°. That inclination is measured in relation to the longitudinal direction.

In a further embodiment of the invention, the structure has curved profiles in its cross-section. In that case, for example, the inclined regions of a sawtooth structure can be concavely curved to make it difficult to fulfil the geometrical condition for total reflection of the light rays incident there. However, wall structure cross-sections, which are curved differently, or which are shaped in accordance with a mathematical function, are also possible and conceivable. Preferably, this involves a regularly repeated geometrical shape.

Although—as mentioned above—bundling or parallelisation of the light issuing from the light guide element can be substantially improved by a change in the geometrical conditions of the wall, and additionally or alternatively, by a simple increase in the absorption coefficient of the wall, a further improvement is possible, if absorption or diffuse reflection is further increased at the structured or blackened regions. For that purpose an advantageous embodiment of the invention provides that a microstructure is arranged on the structure or other regions of the wall, for example, by those regions being diffusely matted, wherein the roughness depth of such matting is between 0.01 µm and 20 µm, preferably about 0.4 µm. Such diffuse matting has the effect, by virtue of its microstructure, that light rays incident at the regions provided with the matting are absorbed or diffusely reflected to an enhanced degree, and thus an inclined ray configuration is prevented, which in turn became noticeable in increased parallelism or bundling of the light issuing from the light exit surface.

A further embodiment of the invention provides that a nanostructure with a roughness depth of between 5 nm and 400 nm is arranged at the regions with an already existing structure and/or blackening or also at further regions of the wall. Such a nanostructure can be produced, for example, by specifically targeted vapor deposition of particles serving as interference locations for light reflection. The above-mentioned microstructure and that nanostructure provide that the surface of the wall that is provided therewith is heavily branched and less smooth so that there, with most of the incident rays, the condition for total reflection is no longer met and in addition rays which are incident in parallel relationship and reflected at a short spacing from each other involve entirely different directions and are therefore diffusively reflected. Rays incident inclinedly on the wall in that region are therefore absorbed or diffusively reflected in such a way that only a small part of that radiation issues from the light guide element at the light exit surface.

In an embodiment of the invention, the structuring and/or blackening of partial regions of the wall of the light guides is afforded by a plurality of mutually superposed thin layers which are also known by the term 'thin films' in the state of the art. A multi-layer thin film is thus arranged at the regions of the wall. The thin films in that case are as light-opaque as possible, that is to say light which passes outwardly through the light guides comprising for example glass at the wall is to be absorbed in a proportion which is as high as possible. The appearance of those plurality of mutually superposed thin films is therefore black, so that the plurality of thin films afford the blackening according to the invention of the light guides. The very small thickness of the thin films also provides for structuring of the wall which, with a suitable thickness, is also to be considered as a nanostructure.

With the mutually superposed arrangement of the thin layers, there are preferably at least two absorption layers and at least two interference layers, wherein the absorption layers are at least partially absorbent for light in the visible spectrum and the interference layers are substantially translucent for light in the visible spectrum and are only little absorbent. In that arrangement, an interference layer alternately follows an absorption layer, wherein a covering, concluding metal layer can be provided at the outside of the plurality of thin layers, that is to say at that side which faces away from the wall of the light guide. With a suitable choice of the layer thickness, that alternate arrangement of absorption and interference layers makes it possible to achieve a level of blackening which is as high as possible, that is to say a degree of absorption which is as high as possible, by means of absorption and destructive interference.

The processes for the production of such thin layers are known in the state of the art by the key word 'thin layer technology'. Examples of such production processes are PVD processes (physical vapor deposition), such as, for example, sputtering or thermal vapor deposition in a vacuum. Depending on the respectively desired degree of reflection or absorption it can be provided that overall between three and seven, preferably five, thin layers of that kind are arranged in mutually superposed relationship.

For example, metal layers such as, for example, chromium layers can be considered as the absorption layers while layers of metal oxide such as for example $SiO_2$ are suitable for the interference layers. The layer thicknesses in that case are so selected that, for the purposes of destructive interference, the degree of reflection for the visible spectral range which is essential for the invention is as low as possible. With light incident in perpendicular relationship the reflection values are for example between 1 and 5%. Preferably, the thicknesses of the absorption layers are between 2 nm and 15 nm while the thicknesses of the interference layers are between 30 nm and 100 nm. The opaque concluding metal layer can be of a thickness of more than 100 nm. It is possible in that respect for the layer thicknesses to be adapted depending on the respective geometrical shape of the light guides, that is to be coated. For example, it can be provided that when coating an inclined surface, a layer thickness which is 15% higher is provided to produce the desired interference conditions.

In a further embodiment of the invention, the structure of the partial regions of the wall of the light guides is afforded by a plurality of optical gratings. In that case the optical gratings each comprise a plurality of grating points (dots) which have specifically calculated profiles and deflect light in specific directions. The optical gratings therefore serve as surface structurings for light deflection. In that case, the light is deflected in a desired direction by a specifically targeted spatial combination of such grating dots and the size and shape thereof, wherein the way in which light is guided is adapted to the respective local geometric and also spectral conditions of the light guides.

The structure arranged in longitudinally extending partial regions of the wall represents a disturbance in the wall which otherwise extends flat. In that respect an embodiment of the invention provides that the depth of that disturbance, that is to say the dimensions of the structure in a substantially perpendicular direction to the wall has a ratio in relation to the smallest cross-sectional extent of the respective light guide of less than 1 to 25, preferably less than 1:50, wherein a microstructure which is possibly additionally arranged, for example in the form of a coating, by means of diffuse matting, has a ratio in that respect of less than 1 to 500, and a nanostructure which is possibly additionally provided has a ratio of less than 1:5000. In the case of a rectangular cross-section, the smallest cross-sectional extent in that case is the height of the light guides which is arranged in that direction in which the individual light guides are arranged in mutually superposed relationship.

It may be particularly advantageous for a light guide element according to the invention for it to have a pronouncedly elongate structure. In an embodiment of the invention the ratio of the smallest cross-sectional extent of the light guides to the length of the respective light guide is less than 1 to 25, preferably less than 1 to 60. An example of such a light guide is of a length of 58 mm and has a smallest cross-sectional extent of 1.1 mm so that the ratio of the smallest cross-sectional extent of the light guide to the length of the light guide is 1 to 52.7.

A further embodiment of the invention provides that the light exit surface arranged transversely relatively to the longitudinal direction and formed by an end of the respective light guides does not comprise a flush mutual superpositioning of the light guides. Instead it is provided that the light guides are arranged in stepped form at the exit surface of the light guide element. In that case it can be provided that the length of the light guides increases from one step to the next, wherein the light guides are arranged in flush mutually superposed relationship at the light entrance surface. In that case, it can be provided that the length of the light guides increases in that direction in which inclinedly extending rays are to be blanked out of the ray bundle.

In a specific situation of installation of a light guide element according to the invention in a lighting device where inclinedly upwardly extending rays are to be blanked out, it may be particularly advantageous if in that case the longest light guide is arranged at the upper side of the light guide element and the length of the light guides then decreases in steps towards the lower light guides, the steps being arranged at the light exit surface. Such a stepped arrangement has the advantage that rays which in the case of a shorter light guide issue from the light exit surface and extend inclinedly upwardly can be reflected or absorbed by longer light guides arranged thereabove. That further improves parallelisation or bundling of the issuing light because rays which extend in the direction of the increase in the steps are blocked by longer steps and are thus blanked out. In that respect it has proven to be particularly advantageous if the regions of the wall provided with a structure or the blackened regions of the wall are always arranged at that side of the light guides, at which there is an adjoining respectively shorter light guide.

In a further embodiment of the invention, it is provided that the light exit surface and/or the light entrance surface has optically treated regions. In that case, the light exit surface and/or light entrance surface of the mutually superposed light guides which are preferably fixed together by adhesive can be plane polished. The light exit surface and light entrance surface can be plane ground and/or polished so that the light exit surface and the light entrance surface are not arranged perpendicularly to the main axis of the light guide element but are inclined at an angle relative to the main axis, that is necessary for a specific blanking-out characteristic, that is to say the light entrance surface and/or the light exit surface are inclined in relation to a plane perpendicular to the main axis. Additionally or alternatively, at least one of the light guides can also be inclined with respect to a main axis.

It can however also be provided that the light entrance surface and additionally or alternatively the light exit surface performs the function of a lens by the light exit surface and/or the light entrance surface having a for example aspheric lens grind. That can be useful to increase the issuing light flux and improve bundling or parallelisation of the entering light rays.

The invention further concerns a lighting device, in particular for a motor vehicle having one or more light sources and a light guide element as set forth hereinbefore, wherein the light emitted by the light sources, preferably after it has already been directed by additional devices, that is to say bundled, passes into the light entrance surface of the light guide element, is there further bundled or parallelised and issues from the light exit surface of the light guide element in the form of a ray bundle which is as sharply defined as possible, that is to say with a marked light/dark limit which can be defined by way of corresponding luminous density values.

In that respect it can be provided that a light source is associated with all or at least a plurality of the light guides. It can however, also be provided that each light guide has its own light source associated therewith and thus a plurality of light sources emit the light passing into the light entrance surface. The light sources themselves can be light emitting diodes which are distinguished by economy and energy efficiency, halogen lamps or other conventional light sources with coherent or incoherent radiation in the visible spectral range.

In a particularly preferred embodiment of the invention, the light source includes a reflector which in turn also includes a part-spherical mirror. In general a light source also emits light in the direction facing away from the light guide element. Such a reflector which can additionally have a part-spherical mirror makes it possible for the radiation emitted in that direction also to be deflected to the light guide element, and in addition thereto, to provide for parallelisation of the entering radiation. In that respect, further deflection mirrors and/or reflectors mean that the radiation emitted in a direction perpendicular to the light entrance surface by the light source can also be deflected in the direction of the main axis.

In a further embodiment of the invention, it is provided that a lens system, that is to say an arrangement of one or more lenses, is disposed between the light source and the light entrance surface of the light guide element. The function of those lenses is to already make the radiation passing into the light guide element as parallel as possible and also to avoid certain aberrations. It may be advantageous for that purpose for the lens system to include an achromat.

For a lighting device according to the invention, it may be particularly desirable if the light/dark limit is adjustable or variable in a certain angular range. That applies to a wall light where for example there may be a wish to vary the light/dark limit according to the respective wall decoration, but also when using a lighting device according to the invention as a headlight for a vehicle. In that case the maximum of the luminous density or also the maximum of the illumination intensity should not be precisely in the horizontal, but should be in an angular range of between about 0.1° and 2° beneath the horizontal. For that reason, a preferred embodiment of the invention provides that the light guide element is rotatable about an axis and can be fixed in a rotated position. In that case that axis is preferably perpendicular to the main axis and a vertical axis perpendicular thereto. Such rotation of the light guide element makes it possible for a ray which extends in a straight line through the light guide element, with a horizontal orientation of the light guide element, to be blanked out, and instead rays which extend in a direction from just below the horizontal to be allowed to pass with as little disturbance thereto as possible. It may further be advantageous if that rotation of the light guide element is variable. That is desirable in particular when the horizontal orientation of the headlight changes due to the motor vehicle being loaded and, with a heavy added load, the maximum of the luminous density or illumination intensity of the emitted light has to be rotated further downwardly.

BRIEF DESCRIPTION OF THE DRAWINGS

Further details and advantages of the present invention will be described more fully hereinafter by means of the specific description with reference to the drawings in which:

FIG. 7 shows a cross-section in the vertical direction to represent the operating principle of a further embodiment of a lighting device according to the invention, FIG. 10 shows a view of the ray path of important rays through a light guide of a light guide element according to the invention to illustrate the operating principle.

DETAILED DESCRIPTION OF THE INVENTION

Figure 1A:
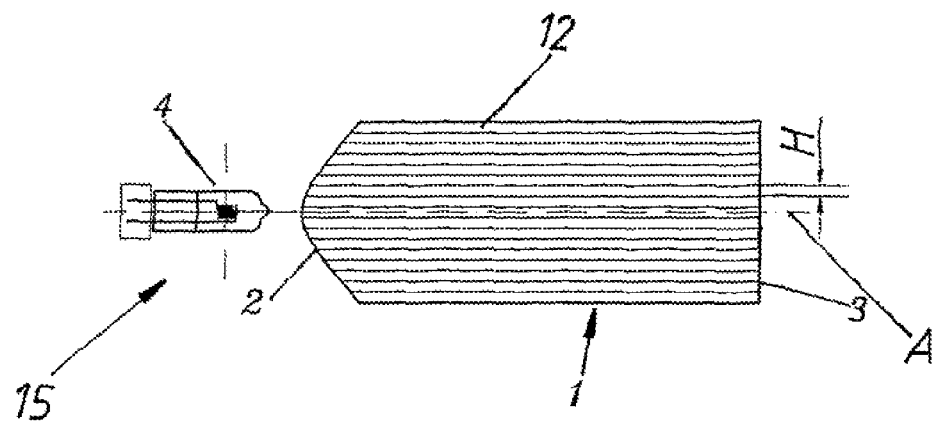
FIGS. 1a through 1c show a cross-section of a lighting device having a light guide element according to the invention and two perspective views of different embodiments of a light guide element according to the invention, FIGS. 2a and b show a cross-section of a further embodiment of a lighting device according to the invention and a perspective view of the associated light guide element, FIGS. 3a and b show a cross-section of a further embodiment of a lighting device according to the invention and a perspective view of the associated light guide element, FIGS. 4a and b show a cross-section of a further embodiment of a lighting device according to the invention and a perspective view of the associated light guide element, FIGS. 5a and b show a cross-section in the vertical direction and a cross-section in the horizontal direction to illustrate the operating principle of an embodiment of a lighting device according to the invention.
Figure 1B:
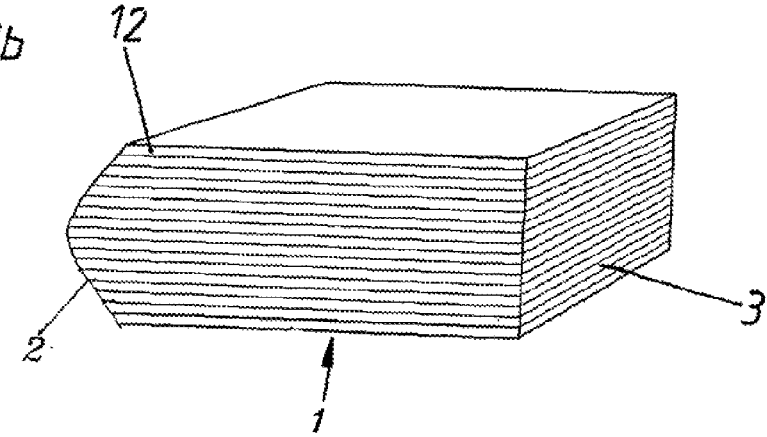
Figure 1C:
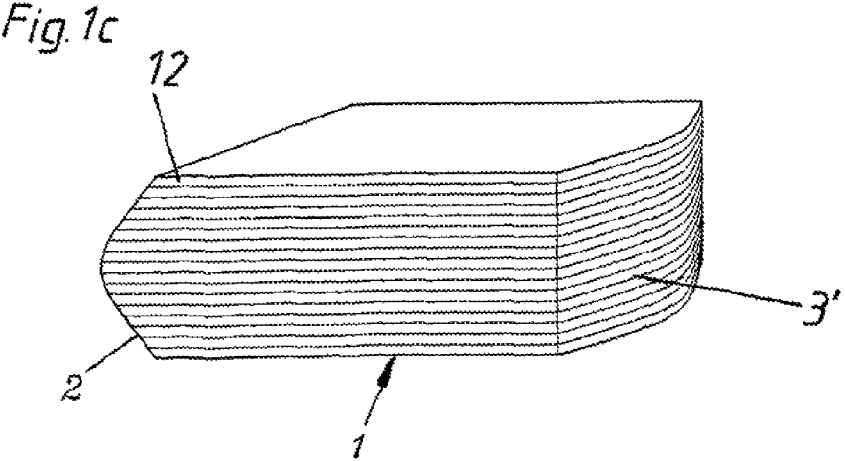

FIG. 1a shows a cross-section through a lighting device 15 according to the invention having a light guide element 1 and an associated light source 4, wherein the section plane was established perpendicularly to the surface of the light guide element 1 through the mutually superposed light guides 12 constituting the light guide element 1. The light guide element 1 is assembled from the light guides 12 in the form of a lamination stack. In this case the individual light guides 12 are each of a substantially equal height H. The light guide element 1 is arranged in the direction of the main axis A, which is disposed in the geometrical center, in this case the centroid, of the plane polished exit surface 3 and extends parallel to the longitudinal edges of the light guides 12. Except for the location of the aspherically ground entrance surface 2, the light guides 12 are of a rectangular cross-section. The entrance surface 2 has an aspheric grind so that a lens function can be performed thereby, by incoming light rays being bundled. FIG. 1b shows a perspective view of the light guide element 1 with the individual mutually superposed light guides 12. FIG. 1c shows a perspective view of another embodiment of the light guide element 1, in which the exit surface 3' is also aspherically ground.

Figure 2A:
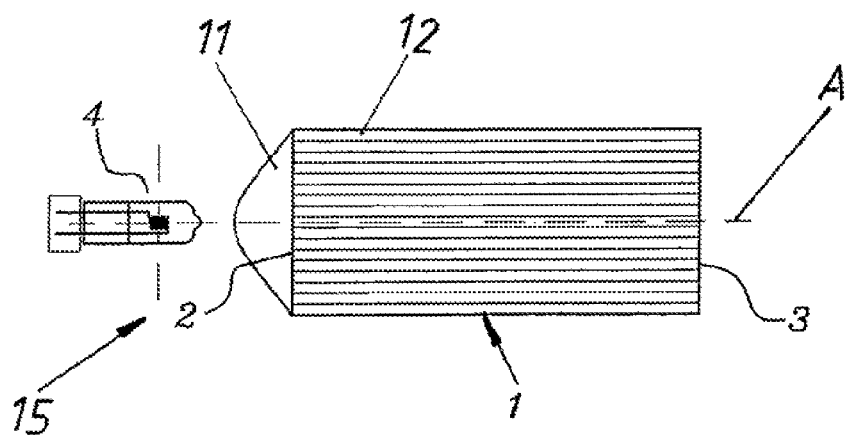
Figure 2B:
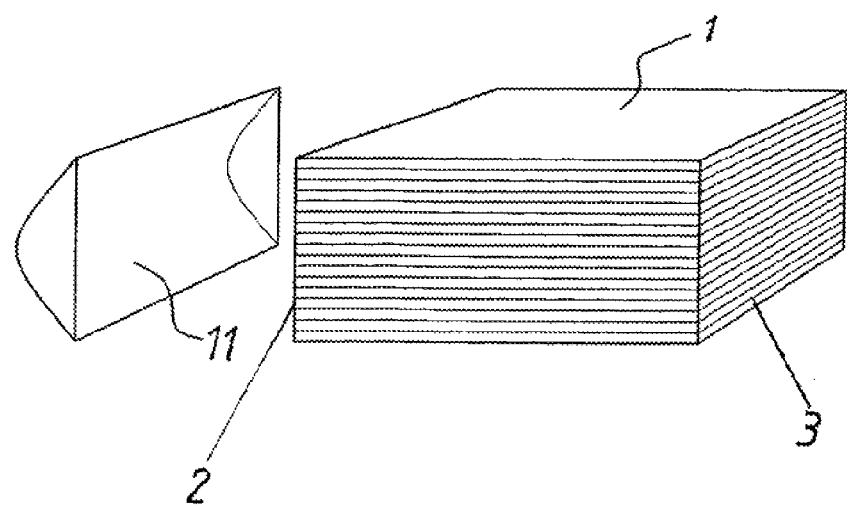

A cross-sectional view of a further embodiment of the light guide element 1, according to the invention in a lighting device 15 with a light source 4, is shown in FIG. 2a, the sectional plane being selected as in FIG. 1a. The light guide element 1 is of a parallelepipedic configuration and comprises light guides 12 which are each of the same size and are arranged in mutually superposed relationship. Disposed at the geometrical center of the plane polished exit surface 3 is the main axis A which is oriented in the longitudinal direction of the light guide element 1, that is to say parallel to the longitudinal edges of the light guides 12. In this embodiment the light entrance surface 2 is also plane polished so that the light guides 12 themselves are parallelepipedic. Instead of aspherically grinding the light entrance surface 2 a lens system 11, in this case consisting of a lens, is arranged directly at the light entrance surface 2. The function of that lens system 11 is to introduce rays coming from the light source 4 into the light guide element 1 as parallel as possible to the main axis A. FIG. 2b shows a perspective view of the light guide element 1 of FIG. 2a and the lens system 11.

Figure 3A:
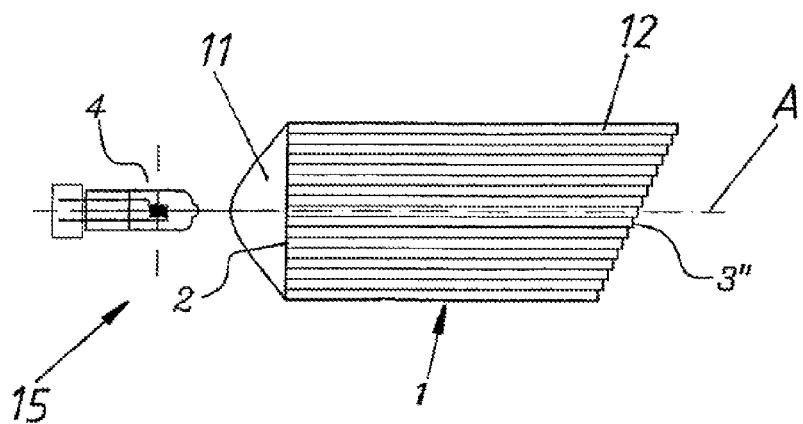
Figure 3B:
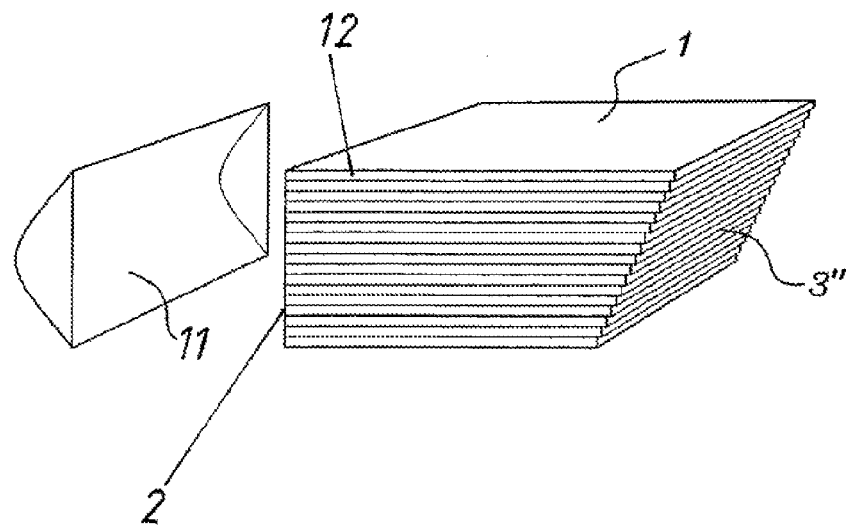

A further embodiment of the invention is shown in FIG. 3a. Once again, a lens system 11 is arranged in front of the plane polished lens entrance surface 2 of the light guide element 1 to parallelise or bundle the light to be coupled in from the light source. It will be noted however that in this embodiment the length of the individual light guides 12, measured in the direction of the main axis A, is different so that the light guides 12 are arranged in a stepped configuration at the light exit surface 3", wherein the length of the light guides 12 increases from below upwardly. The main axis A is arranged at the point of intersection of the two axes of symmetry of the light exit surface 3". That provides that rays issuing inclinedly upwardly out of the light exit surface 3" can be at least partially blocked by longer light guides 12 arranged thereabove and can be blanked out of the ray bundle. FIG. 3b shows a perspective view of this embodiment of the light guide element 1 according to the invention and the lens system 11. The individual light guides 12 are once again of a parallelepipedic configuration.

Figure 4A:
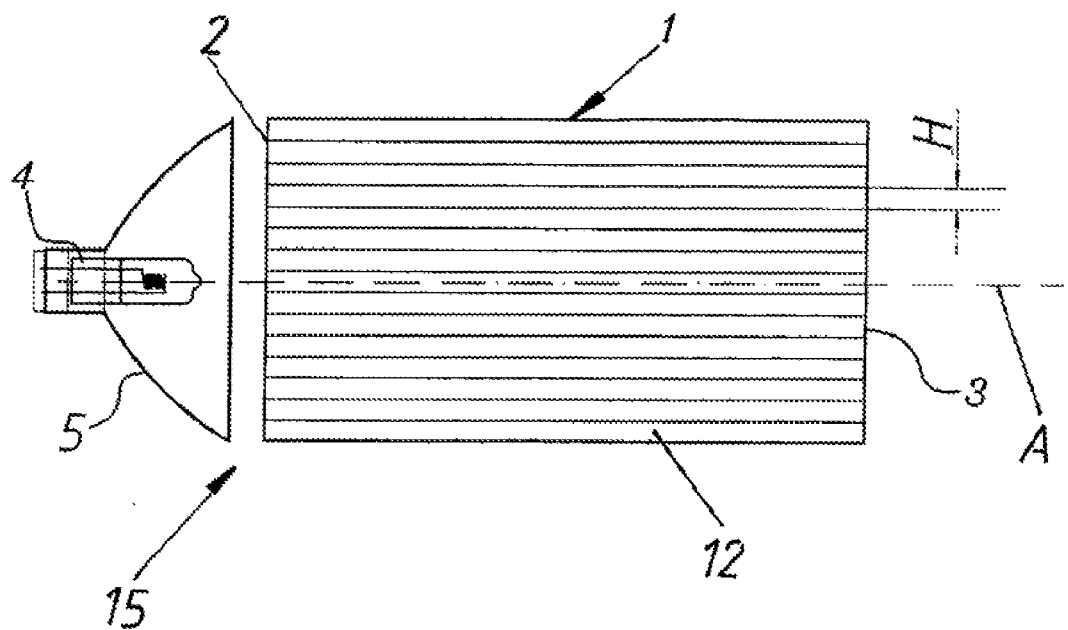
Figure 4B:
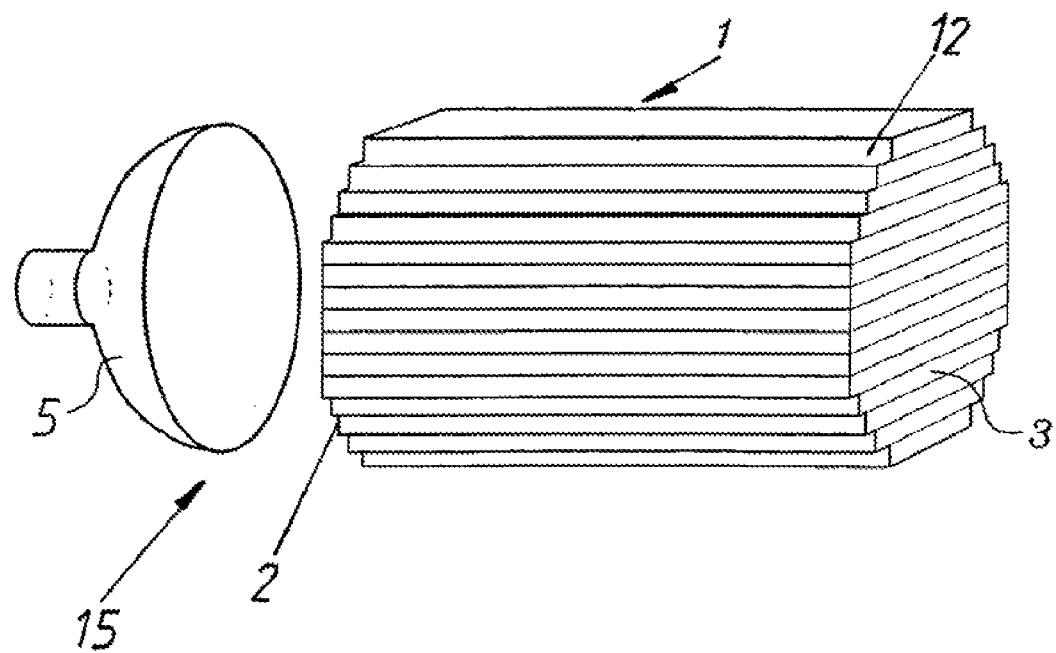

A further embodiment of a lighting device 15 according to the invention is shown in FIG. 4a. The light guide element 1 comprises mutually superposed parallelepipedic light guides 12 and a plane polished light entrance surface 2 as well as a plane polished light exit surface 3. The height H of the individual light guides 12 is substantially the same for all thereof. Associated with the light source 4 is a reflector 5 which can have a reflective coating inside. That performs a similar function to the lens system 11 referred to in the foregoing Figures. Light rays issuing from the light source 4 and differing greatly from the direction of the main axis A are at least partially parallelised by the reflector. FIG. 4b shows a perspective view of the reflector 5 and the light guide element 1. It can be seen in this respect that the width of the individual light guides 12 is not the same for all the light guides 12 but increases from a smallest value at top and bottom to a greatest value in the region of the central layer of the light guide element 1.

Figure 5A:
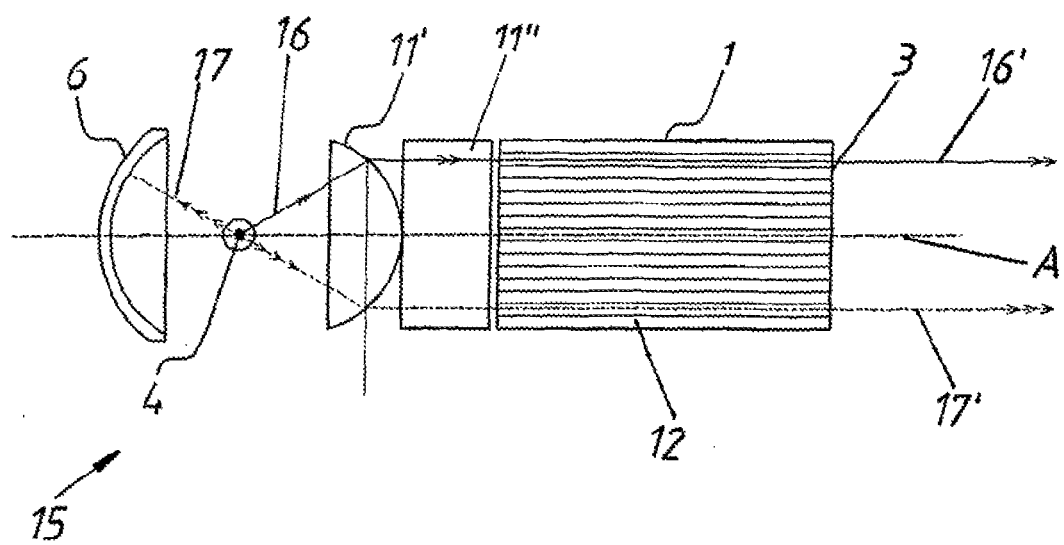

FIG. 5a shows a cross-section through an embodiment of the lighting device 15, the section plane being placed perpendicularly to the light guides 12 and through the main axis A as in the preceding Figures. The lens system 11 comprises two lenses 11' and 11". The reflector 5 includes a part-spherical mirror 6 in the form of part of a sphere, of which the size, inside sphere radius and position in relation to the lighting means is such that a maximum luminous flux is in turn reflected on to the lens system 11, wherein here only the part-spherical mirror 6 itself is illustrated. The parallelepipedic light guide element 1 comprises mutually superposed light guides 12 of substantially the same size and thereby forms a kind of layer stack. As can be seen from FIG. 5a both the part-spherical mirror 6 and also the lens system 11 serve for parallelisation or bundling of the light rays issuing in the direction of the main axis A. Light rays 16 emitted by the light source 4 in the direction of the light entrance surface 2 but oriented inclinedly relative to the main axis A are deflected by the lens system 11 in the direction of the main axis A. The projection of the issuing light ray 16' into the plane of the section is therefore at least substantially perpendicular to the light exit surface 3. Light rays emitted by the light source 4 in directions away from the light entrance surface 2 are reflected by the part-spherical mirror 6 and are then also coupled into the light guide element 1 and also issue after passing therethrough in the direction of the main axis A in such a way that the projection of the issuing light ray 17' into the plane of the section is at least substantially perpendicular to the light exit surface 3. Depending on the respective dimensioning of the light guide element 1 for example the issuing light rays 16' and 17' may issue from the light exit surface 3 only at an angle of for example between −2° and 2°, preferably between −2° and 0°, with respect to the perpendicular to the light exit surface 3. It can however also be provided that only a part of the issuing ray bundle is blanked out by the light guide element 1 and substantially only rays whose projection into the plane of the section is oriented approximately perpendicularly to the light exit surface 3 or downwardly issue from the light guide element 1.

Figure 5B:
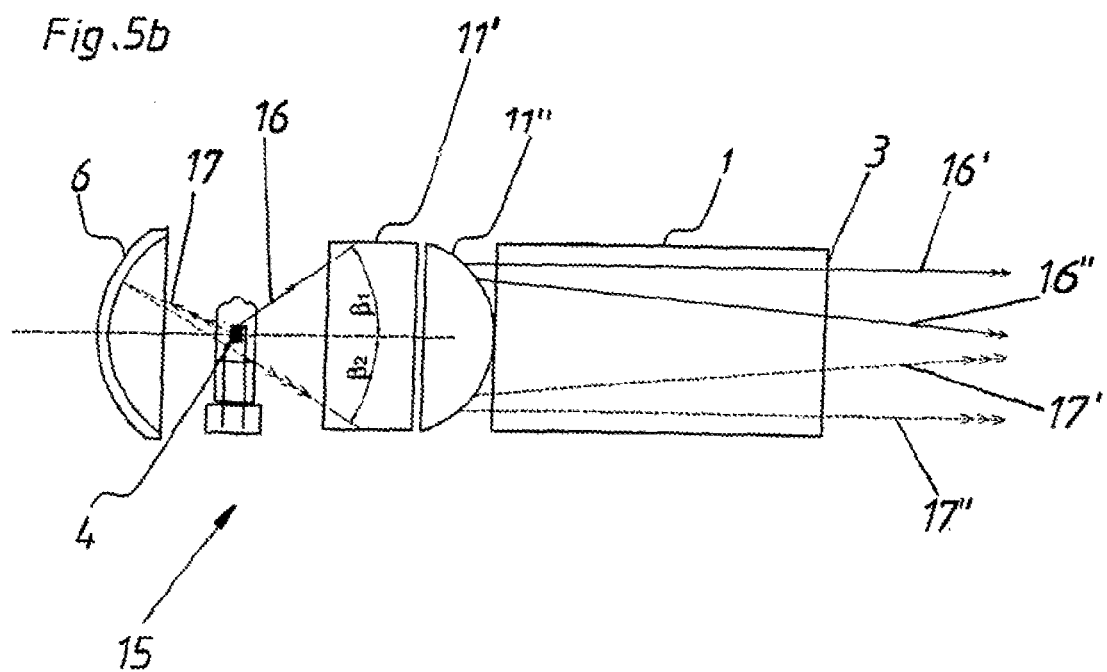

A further sectional view of this embodiment of the lighting device 15 is shown in FIG. 5b, the section plane in this Figure being perpendicular to that in FIG. 5a. It will be seen that the maximum coupling-in angle is given by $\beta_1 + \beta_2$. Once again rays 16 emitted by the light source 4 in the direction of the light entrance surface 3 are parallelised by the lens system 11 comprising two lenses 11' and 11". Rays 17 emitted in other directions are also parallelised after reflection at the part-spherical mirror 6. As can be seen by reference to the issuing light rays 16', 16" and 17', 17", bundling of the issuing light rays in that section plane is not so pronounced as in the section plane in FIG. 5a. Thus the projections of the issuing light rays 16', 16" and 17', 17" into the section plane in FIG. 5b can differ for example by up to 5° from the perpendicular to the light exit surface 3. By virtue of the lesser deviation in the direction as is shown in FIG. 5a the result is that in this embodiment a meaningful light/dark limit is formed by a plane perpendicularly to the section plane in FIG. 5a and parallel to the section plane in FIG. 5b.

Figure 6:
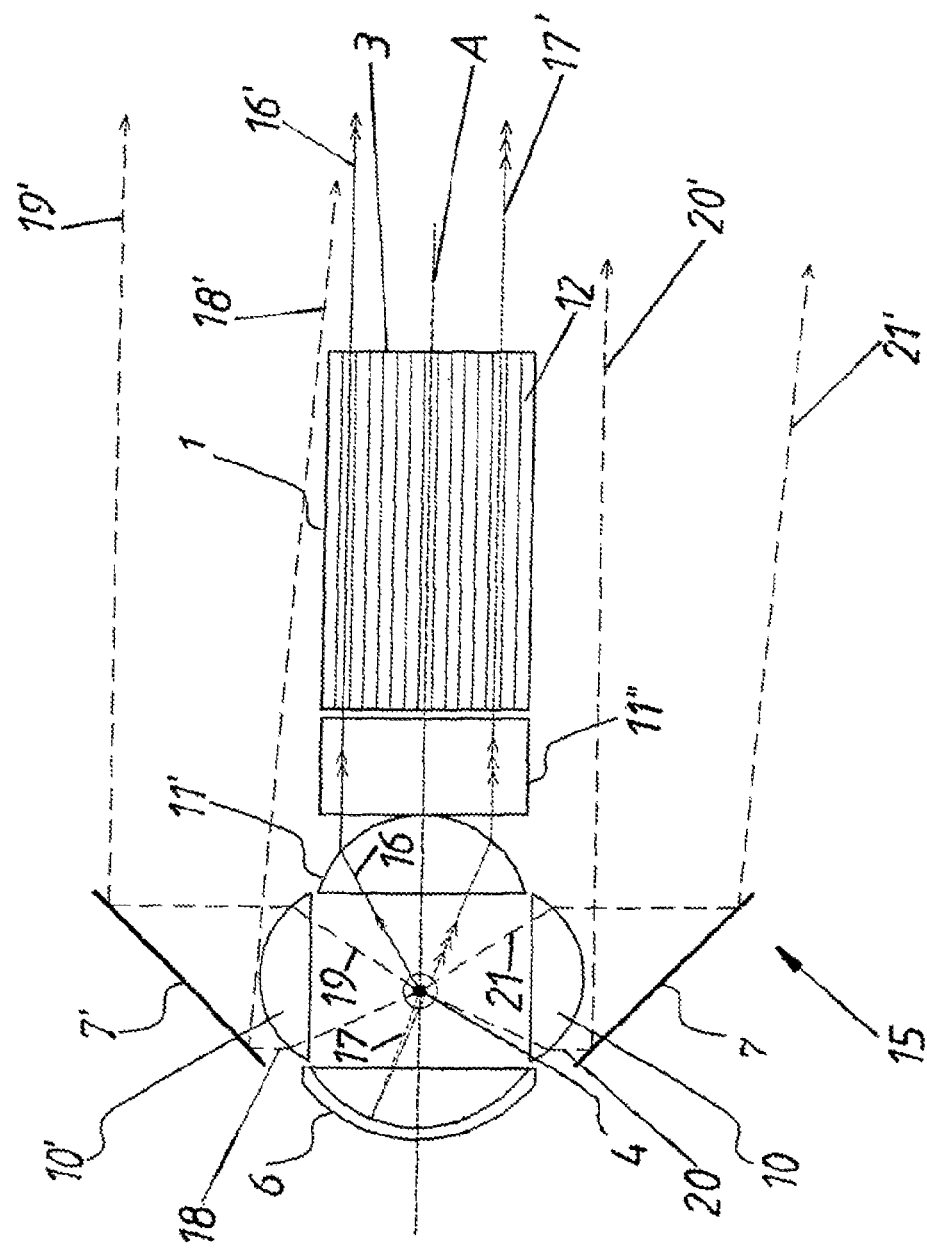
FIG. 6 shows a cross-section in the vertical direction to represent the operating principle of a further embodiment of a lighting device according to the invention.

A cross-sectional view through a further embodiment of the lighting device 15 according to the invention is shown in FIG. 6, the section plane being perpendicular to the parallel-epipedic light guide element 1 as shown in FIG. 5a and the main axis A again being arranged in that section plane. In this case the main axis A is also again arranged at the geometrical center of the light exit surface 3. The lens system 11 comprises two lenses 11' and 11", whereby light rays 16 emitted by the light source 4 in the direction of the light entrance surface 2 are already deflected and thus bundled before passing into the light guide element 1, in the direction of the main axis A. The same applies to rays 17 emitted in other directions after they have been reflected by the part-spherical mirror 6. The light guide element 1 then further parallelises or bundled the rays passing therethrough, in accordance with the invention, so that the issuing rays 16' and 17' or at least the projections thereof into the section plane involve a slight deviation of for example between 0 and −2° with respect to the perpendicular to the light exit surface 3, that is to say a line parallel to the main axis A. In addition the lighting device 15 has further lenses 10 and 10' and associated lower and upper deflection mirrors 7 and 7' respectively, whereby rays issuing from the light source 4 which are not caught by the part-spherical mirror 6 or the lens 11' are also deflected in the direction of the main axis A to achieve a total light distribution which is desired in the respective situation of use, wherein those rays 18', 19', 20' and 21' or at least the projections thereof into the section plane can have for example a deviation to the extent of between 0 and −5° with respect to a line parallel to the main axis A. That makes it possible to implement a pronounced light/dark limit through a plane parallel to that plane, with a higher degree of overall luminous effect.

A further embodiment of a lighting device 15 according to the invention is shown in a sectional view with a section plane selected as above in FIG. 7. In this case the reflector 5 associated with the light source 4, besides the part-spherical mirror 6, further includes a lower and an upper reflector 8 and 8' respectively. By virtue of that arrangement, even without the lenses 10 and 10', it is possible to provide a similar ray path and thus a similar light/dark limit as in FIG. 6.

As mentioned hereinbefore the lens system 11 already produces a ray bundle entering the light guide element 1 through the light entrance surface 2. Now a function of the light guide element 1 is to further trim that narrow ray bundle, that is to say further to bundle it, by a procedure whereby the main part of the ray bundle can pass in a straight line and unimpededly through the light guide element 1 and a part of the rays is passed to the light exit surface 3 by way of reflection, for example by total reflection, while a part of the rays is absorbed or diffusely reflected and is blanked out of the ray bundle.

Figure 8A:
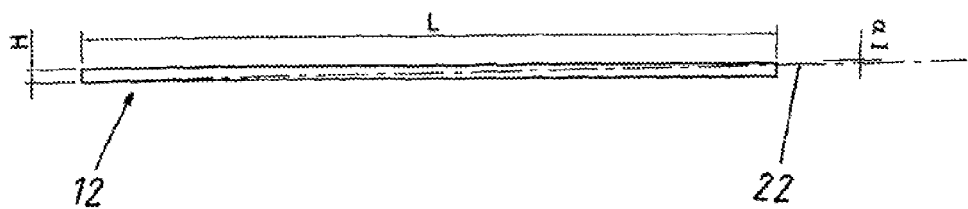
FIGS. 8a to c show a cross-section through three embodiments of light guides of a light guide element according to the invention, FIGS. 9a and b show two detail views of the cross-section of two embodiments of light guides of the light guide element according to the invention.
Figure 8B:
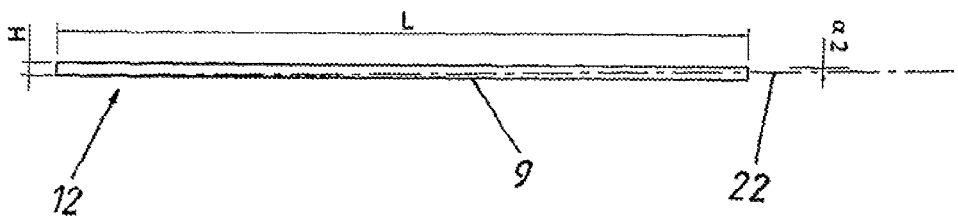
Figure 8C:
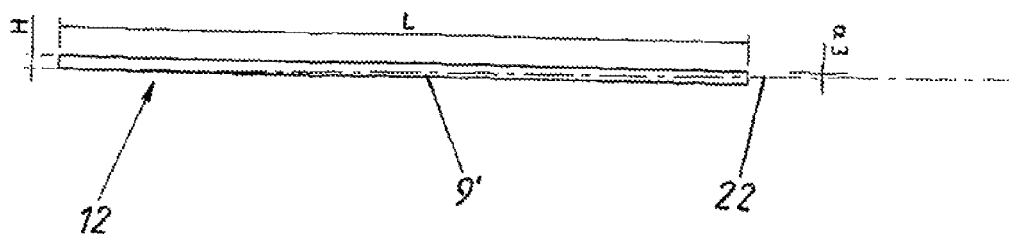
Figure 11:
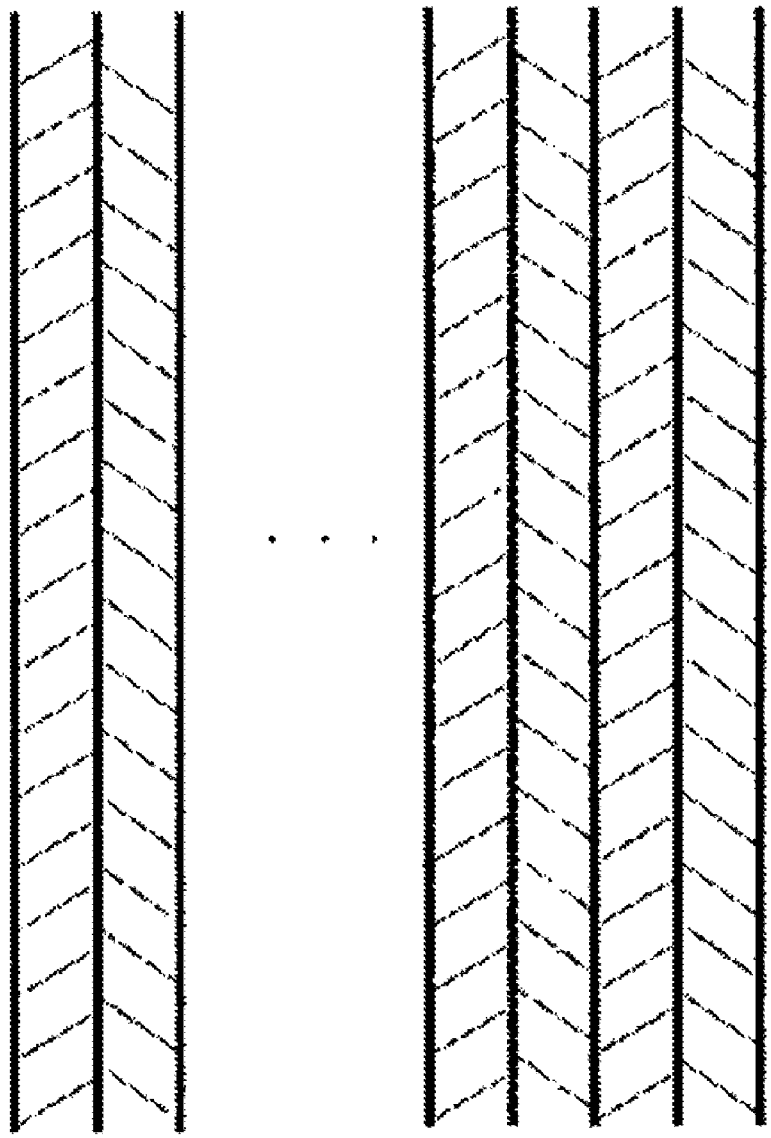
FIG. 11 shows an alternating stack of absorption and interference layers.

FIGS. 8a through c show a cross-section of an individual light guide 12 of the light guide element 1. The effective radiation angle $\alpha_1$, that is to say that angle with respect to the longitudinal direction of the light guide 12, is given by that ray 22 which extends inclinedly but in a straight line and without contact with the wall, with the exception of the light coupling-in and light exit surfaces of the light guide 12. Thus the effective radiation angle is given by the ratio of the length L to the height H of the light guide. In this embodiment that ratio L to H is 80:1, whereby $\alpha_1$ is approximately 0.7°. In the light guides shown in FIGS. 8a through c, the wall is provided with a structure or an absorbance in the region of the underside of the longitudinal direction of the light guide so that $\alpha_1$ is the maximum angle that a ray can have with respect to the longitudinal direction of the light guide 12, upwardly. A plane parallel to the longitudinal direction and perpendicular to the illustrated section plane therefore represents a light/dark limit of a lighting device 15 according to the invention. While in FIG. 8a the underside of the wall still does not have any difference in relation to the top side of the wall of the light guide 12, in FIG. 8b the underside of the wall of the light guide 12 is provided with a structure 9, the cross-section of that structure involving a sawtooth profile with a tooth inclination of 3°. In that way the ray 22 which otherwise enters in the same way as in FIG. 8a is deflected in the direction of the underside of the wall of the light guide 12 so that the angle $\alpha_2$ of the inclination of the ray 22 upwardly is less than the angle $\alpha_1$. A change in the structure as in FIG. 8c where the structure 9' is additionally diffusely matted, that is to say is provided with a microstructure, means that the angle of inclination $\alpha_3$ upwardly of the issuing ray 22 is further reduced, whereby the light/dark limit is further sharpened and defined more precisely.

The mode of operation of the light guide element 1 is shown in the detail views in cross-section of light guides 12 in FIGS. 9a and 9b. In FIG. 9a the light guide 12 is provided at its underside of the wall with a structure 9 which in this case in cross-section involves a sawtooth profile with a tooth inclination $\gamma_1$. There is no structure of that kind at the top side 13 of the wall so that a ray 23 incident there can be transmitted by way of total reflection. It can also be provided that this region of the wall is of a mirrored nature. Other entering rays 24 and 24', which in themselves would satisfy the geometrical conditions for total reflection in relation to a wall extending flat, are blocked by the perpendicular edges of the sawtooth profile of the structure 9. The ray 25 is incident on the inclined side of the sawtooth profile of the structure 9. In this embodiment the structure 9 is diffusely matted whereby only a certain part 25' of the ray 25 experiences total reflection while a large part 14 of the ray 25 is diffusely reflected and can therefore no longer issue from the light guide element 1 at the light exit surface 3. The ray 25' experiences total reflection at the top side of the wall while at the next incidence on the structure 9 once again only a small part 25" experiences total reflection while a large part 14' of the ray 25' is again diffusely reflected. That makes it possible for rays which are inclined upwardly with respect to the top side 13 of the wall, that is to say with respect to the longitudinal direction of the light guide 12, to be effectively absorbed out of the ray bundle. FIG. 9b shows an embodiment of a light guide 12 with a structure 9' of a different configuration, in which case the tooth flanks are not flat but are curved. In that way, the geometrical condition for total reflection is not met everywhere for rays 25 incident on those two flanks, so that a part of the ray is refracted and is deflected perpendicularly to a wall while a small part 25' is reflected. Once again the structure 9' is diffusively matted so that a large part 14 of the ray 25 is deflected by diffuse reflection. After total reflection of the ray 25' at the top side 13 of the wall, in which respect the top side 13 of the wall can also be mirrored, at the next incidence on the structure 9' once again only a part 25" is reflected and a large part 14' is diffusely reflected. Further rays 36 are blocked after reflection at the tooth flanks by the perpendicular flanks To further illustrate the mode of operation of a light guide element 1 according to the invention, by reference to one of the mutually superposed light guides 12, FIG. 10 shows further ray paths of important rays. In that respect the light guide 12 is not illustrated in respect of its entire length L but interrupted. In contrast to the top side 13 of the wall the underside of the wall is provided with a structure 9 and a coating, wherein the depth $d_A$ of the structure, that is to say the extent of the structure perpendicularly to the longitudinal direction, is in that case much less than the height H. For example the ratio $d_A$ to H is less than 1:25 and that of the thickness of the coating to H is less than 1:500. The aim of the lamellar light guide element 1 is to effectively blank rays which are inclined upwardly with respect to the direction of the rays S1, that is to say with respect to the main axis A, out of the issuing ray bundle and thereby result in parallelisation and bundling of the issuing ray bundle. The energetic main part of the incoming ray bundle is in an angular range α given by the rays S1 and S3. All further rays which are also caught are in an angular range β which is given by the rays S4 and S5 and admittedly form a smaller energetic proportion, but are troublesome in terms of their exit angle and are effectively absorbed or at least parallelised by the structure 9 at the underside of the wall of the light guide 12. The ray S6 defines the border ray which is still just passing through the light guide 12 without contact with the top side 13 or the underside of the wall. The angle δ which gives the maximum angle of inclination upwardly, that the issuing ray bundle can assume, is defined by that limit ray S6. The energetic main part of the issuing ray bundle is in that case in an angle α' while all the issuing ray bundle is in an angular range β'.

It will be appreciated that the invention is not limited to the illustrated examples but embraces all technical equivalents.

The positional references adopted in the description such as for example up, down, and so forth are also related to the directly described and illustrated Figure and are to be appropriately transferred to the new position upon a change in position.

In addition the lighting device according to the invention is not limited to the illustrated examples such as headlights but embraces all possible conceivable areas of use such as street lighting arrangements, tunnel lighting arrangements, internal and external lighting arrangements for buildings and establishments of any kind such as for example wall lighting arrangements or sports ground lighting arrangements and so forth.

The invention claimed is:

1. A light guide element for a lighting device, comprising:
 a light entrance surface;
 a light exit surface; and
 a plurality of mutually superposed light guides;
 wherein each light guide of said plurality of mutually superposed light guides includes a wall having a partial region,
 wherein said light guide element is elongated in a direction of a main axis, said light entrance surface extends transversely relative to the longitudinal direction, and said light exit surface is configured to emit light transversely with respect to the longitudinal direction, and
 wherein said partial region of said wall for each said light guide extends in the longitudinal direction, and is structured such that light rays propagating in said plurality of mutually superposed light guides are at least one of diffusely reflected and absorbed by said partial region in each said light guide.

2. The light guide element as set forth in claim 1 wherein said partial region in each said light guide is blackened.

3. The light guide element as set forth in claim 1 wherein said partial region in each said light guide extends substantially over an entire length of each said light guide.

4. The light guide element as set forth in claim 1 wherein each said light guide directly or indirectly contacts another light guide.

5. The light guide element as set forth in claim 1 wherein each said light guide of said plurality of light guides includes another wall extending in the longitudinal direction and having a partial region, said partial region of said another wall being mirrored and being opposite to said partial region of said wall.

6. The light guide element as set forth in claim 1 wherein each said light guide is a solid body and substantially transparent in the visible spectral range of light.

7. The light guide element as set forth in claim 1 wherein said plurality of superposed light guides includes more than ten mutually superposed light guides.

8. The light guide element as set forth in claim 1 wherein each said light guide has a prismatic configuration.

9. The light guide element as set forth in claim 7 wherein for each said light guide, said partial region is disposed on a longitudinal side.

10. The light guide element as set forth in claim 1 wherein for each said light guide, said partial region has a sawtooth profile along a cross-section thereof.

11. The light guide element as set forth in claim 10 wherein said sawtooth profile has a tooth inclination of between 3° and 45°.

12. A light guide element as set forth in claim 1 wherein for each said light guide, said partial region has a curved profile along a cross-section thereof.

13. The light guide element as set forth in claim 1 wherein for each said light guide, said partial region has a geometrical shape along a cross-section thereof.

14. The light guide element as set forth in claim 1 wherein for each said light guide, said partial region is diffusively matted, wherein the roughness depth is between 0.01 μm and 20 μm.

15. The light guide element as set forth in claim 1 wherein for each said light guide, said partial region has a nanostructure with a roughness depth of between 5 nm and 400 nm.

16. The lighting device as set forth in claim 1 wherein for each said light guide, said partial region is structured by a plurality of mutually superposed thin layers.

17. The lighting device as set forth in claim 16 wherein said plurality of mutually superposed thin layers include at least two interference layers and at least two absorption layers, wherein said interference layers and said absorption layers are arranged alternately and wherein said absorption layers are at least partially absorbent of light in the visible spectrum and said interference layers are substantially translucent for light in the visible spectrum.

18. The lighting device as set forth in claim 17 wherein said absorption layers comprise metal and said interference layers comprise metal oxides.

19. The lighting device as set forth in claim 15 wherein for each said light guide, said partial region is structured by a plurality of optical gratings arranged at said partial region so as to provide said partial region with a nanostructure.

20. The light guide element as set forth in claim 1 wherein a ratio of a depth of said partial region to the smallest cross-sectional extent of each said light guide is less than 1:25.

21. The light guide element as set forth in claim 1 wherein a ratio of a depth of said partial region to the smallest cross-sectional extent of the light guide is less than 1:60.

22. The light guide element as set forth in claim 1 wherein said plurality of light guides increase in length in a stepped configuration, the stepped configuration being arranged at said light exit surface.

23. The light guide element as set forth in claim 1 wherein said light exit surface and said light entrance surface are optically treated.

24. The light guide element as set forth in claim 1 wherein at least one of said light entrance surface and said light exit surface is plane ground or is inclined with respect to a plane perpendicular to a main axis that extends in the longitudinal direction.

25. The light guide element as set forth in claim 1 wherein said light exit surface is configured to enable a limit ray issuing therefrom to be at an angle to a main axis extending in the longitudinal direction of less than 1°.

26. The light guide element as set forth in claim 1 wherein each said light guide is substantially parallelepipedic, and wherein a length of each said light guide is more than 100 mm, a width of each said light guide is more than 50 mm and a height of each said light guide is between 1 and 5 mm.

27. A lighting device for a vehicle headlight comprising at least one light source and said light guide element as set forth in claim 1.

28. The lighting device as set forth in claim 27 wherein each said light guide has a light source associated therewith.

29. The lighting device as set forth in claim 27 wherein a lens system is arranged between said at least one light source and said light entrance surface.

30. The lighting device as set forth in claim 27 wherein a reflector is associated with said a least one light source.

31. The lighting device as set forth in claim 30 wherein said reflector includes a part-spherical mirror.

32. The light guide element as set forth in claim 6 wherein said solid body is a glass body.

33. The light guide element as set forth in claim 7 wherein said plurality of superposed light guides includes more than more than twenty superposed light guides.

34. The light guide element as set forth in claim 8 wherein each said light guide has a parallelepipedic configuration.

35. The light guide element as set forth in claim 9 wherein for each said light guide, said partial region is disposed at an underside of a rectangular cross-section.

36. The light guide element as set forth in claim 11 wherein said sawtooth inclination is between 3° and 10°.

37. The light guide element as set forth in claim 14 wherein said roughness depth is about 0.4 μm.

38. The light guide element as set forth in claim 20 wherein said depth of said partial region to the smallest cross-sectional extent of each said light guide less than 1:50.

39. The light guide element as set forth in claim 23 said light entrance surface has a plane polished or an aspherically ground region.

40. The light guide element as set forth in claim 1 wherein said light exit surface is configured to enable a limit ray issuing therefrom to be at an angle to a main axis extending in the longitudinal direction of less than less than 0.7°.

41. The light guide element as set forth in claim 29 wherein said lens system is an achromat and directly adjoins said light entrance surface.

* * * * *